Feb. 24, 1931.   C. G. EDWARDS   1,793,685
COUNTER THRUST PRESSURE MOTOR
Filed Feb. 12, 1930
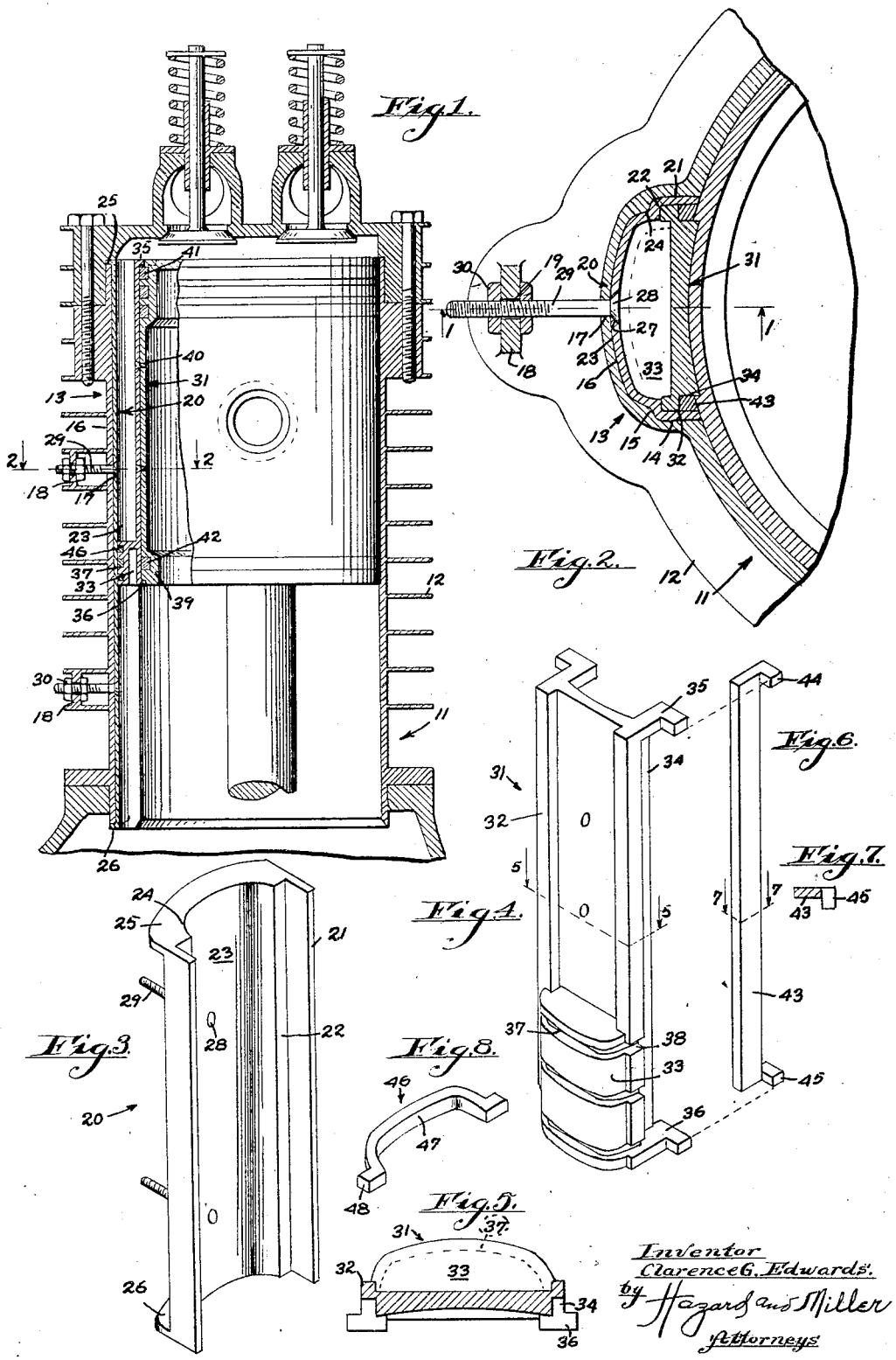

Patented Feb. 24, 1931

1,793,685

UNITED STATES PATENT OFFICE

CLARENCE G. EDWARDS, OF LOS ANGELES, CALIFORNIA

COUNTERTHRUST PRESSURE MOTOR

Application filed February 12, 1930. Serial No. 427,834.

My invention pertains to a counter-thrust pressure motor of the type in which the lateral pressure on a piston operating the cylinder is resisted by a slight pressure on the piston caused by the exploding fuel.

My invention is of a type similar to my prior U. S. Patents No. 1,678,424, issued July 24, 1928; No. 1,701,322, issued February 5, 1929, for counter thrust pressure motors, and applications for Letters Patent, Serial No. 269,087, filed April 11, 1928, Serial No. 378,514, filed July 15, 1929, for counter thrust pressure motor. The features of the present invention are a particular improvement on my application Serial No. 385,935, filed August 14, 1929. In this application, one of the features of the invention is in the form of a compression ring adapted to prevent passage of the exploding gases along the side of the hanger attached to the piston.

Another feature pertains to the type of compression rings used on the filler block at the base of the hanger to prevent the downward blowing of the gases into the crank case of the engine.

Another feature of my invention pertains to the construction and mounting of a filler channel in the channel of the cylinder, to retain such filler channel in position for the proper reciprocating operation of the hanger of the piston. My invention also pertains to the manner of construction and attachment of the hanger on the piston and the piston rings being fitted underneath the hanger. This construction is illustrated in connection with an air cooled engine, in which the channel for operation of the hanger is formed as an integral part of the cylinder.

My invention is illustrated in the accompanying drawings, in which,

Fig. 1 is a vertical section through the cylinder with the portions broken away through the channel on the line 1—1 of Fig. 2;

Fig. 2 is an enlarged partial section on the line 2—2 of Fig. 1 in the direction of the arrows;

Fig. 3 is a perspective view of the filler channel piece to fit in the channel of the cylinder to accommodate the hanger;

Fig. 4 is a perspective view of the hanger for attachment to the piston;

Fig. 5 is a section through the hanger on the line 5—5 of Fig. 4 in the direction of the arrows;

Fig. 6 is a perspective view of one of the compression springs on the side of the hanger;

Fig. 7 is a transverse section of Fig. 6 on the line 7—7;

Fig. 8 is a perspective view of one of the compression springs to fit in the lower portion of the hanger.

In the present construction the cylinder block is indicated by the numeral 11, this having a series of cooling fins 12 and formed integral with the cylinder there is formed a channel section 13 extending longitudinally of the cylinder. This channel section has an inside surface 14 substantially parallel to a radius of a cylinder, an inwardly extending vertical rib 15 and a smoothly curved section 16 of slightly larger radius than the radius of the cylinder.

The cylinder channel also has a series of openings 17 at the side and formed between certain of the fins there are bridging bars 18, each having a perforation 19 therethrough. The filler channel pieces 20 are formed with side flanges 21 extending from end to end, such flanges fitting against the vertical surface 14 of the channel of the cylinder. There is an inwardly extending shoulder 22 at the base of the flanges and a curved section 23. Inside and outside surfaces of this curved section are concentric, the outside surface fitting against the surface 16 of the channel of the cylinder. Adjacent the shoulder 22 the filler channel has a longitudinal inward groove 24 adapted to accommodate the longitudinal rib 15 of the channel. At the top and bottom of the filler there are outwardly extending flanges 25 and 26, these being adapted to fit over the top and the bottom respectively of the channel structure of the cylinder.

There are a plurality of tapered perforations 27 through the filler channel which receive the counter-sunk heads 28 of the bolts 29. These bolts extend through the perforation 19 in the bridging pieces 18, such bolts being tightly clamped by the nuts 30; thus securely holding the filler channel in position and forming a gas-tight seal at the counter-sunk heads and at the openings in the channel for the passage of the bolts.

The hanger designated generally by the numeral 31 is provided with side ribs 32 extending longitudinally thereof with a hollow filler block 33 at the bottom. At the back of each rib there is a vertical angular channel 34 extending between the inwardly extending angular lugs 35 on the top of the hanger and somewhat similar inwardly extending lugs 36 on the bottom of the hanger. The filler block portion is provided with grooves 37 extending around the outer section of such block, these grooves having an extension 38 through the ribs 32. The top and bottom of the piston is designed so that the lugs 35 and 36 may fit in the top and bottom portions of the piston, the piston having an enlargement 39 at the bottom to accommodate the lower part of the hanger. The hanger is secured to the piston by screws 40. There are piston rings 41 extending around the upper portion of the piston behind the hanger and the lower piston ring 42 extending around the lower portion of the skirt of the piston; such ring being accommodated in the enlargement 39.

The marginal compression spring 43 has a body structure rectangular in cross section as illustrated particularly in Figs. 6 and 7 and at the top and bottom there are laterally projecting lugs 44 and 45. The compression packing spring 43 is adapted to fit in the angular groove 34 in the hanger, the upper and lower ends bearing on the inside of the ends 35 and 36 of the filler block. This construction together with the lugs 44 and 45 conforming to the angular shape of the ends 35 and 36, prevent upward and downward movement of this compression spring.

The compression spring 46 fits in the grooves 37 of the filler block and is provided with a middle section 47 to conform to the shape of the grooves 37 and with laterally projecting ends 48. These ends fit in the grooves 38 through the ribs 32 and are designed to abut against the longitudinal packing strip or spring 43. This construction prevents the ends of the compression strips or springs 46 from wearing into the filler channel or the channel of the cylinder.

From the above description together with the drawings, it will be seen that I have devised a construction by which the filler channel is fitted in the integral channel in the wall of the cylinder by a single row of fastening devices extending outwardly through the center of the channel in the cylinder. Also that the hanger has been provided with packing strips which are so mounted as to prevent air on the upper and lower part of the piston or of the hanger and effect an improved sealing of the construction against the pressures of the exploded gases.

Various changes may be made in the principles of my invention without departing from the spirit thereof as set forth in the description, drawings and claims.

I claim:

1. An engine having a cylinder with a longitudinal channel on one side, a filler channel fitting therein and having securing devices extending from the filler channel through the cylinder wall in the channel thereof, with attaching means exterior to the cylinder.

2. An engine having a cylinder with an integral channel on one side, a filler channel fitting therein and having a row of fastening devices extending from the filler channel through the channel part of the cylinder and engaging fastening means on the outside of the cylinder.

3. An engine having a longitudinal channel on one side, a filler channel fitted therein, bolts extending from the filler channel through the channel portion of the cylinder and secured to attaching means outside of the cylinder.

4. An engine having a cylinder with a longitudinal channel on one side, said channel having a curved inner face, a filler channel fitting therein and conforming to the shape of the face of the channel, there being openings through the center portion of the cylinder at the channel, bolts having counter-sunk heads secured in the filler channel and extending through the said openings, with attaching means on the outside of the cylinder to be engaged by the bolts.

5. An engine comprising in combination a cylinder having a channel on one side, a piston having a hanger on one side operating in the said channel, packing strips on the marginal edges of the hanger, said strips having enlargements at the end to form an enlarged bearing surface.

6. An engine, comprising in combination a cylinder having a channel at one side, a piston having a hanger operating in the said channel, packing strips on the marginal edge of the hanger, said packing strips having enlargements engaging the upper and lower ends of the hanger.

7. An engine comprising in combination a cylinder having a channel on one side, a piston having a hanger operating in said channel, with marginal grooves, packing strips fitted in the grooves, the hanger having inwardly extending lugs on the top and bottom and the strip having upper and lower lugs forming an enlarged bearing surface and engaging the lugs on the hanger.

8. An engine as claimed in claim 7, the lugs extending outwardly in a somewhat circumferential direction in reference to the cylinder on the hanger and the strips.

9. An engine comprising in combination a cylinder having a channel in one side with an inwardly extending shoulder, a piston having a hanger thereon with a rib fitting against the said shoulder and grooves adjacent the rib, packing strips fitted in the said grooves and having enlargements at the upper and lower ends engaging the upper and lower end of the hanger.

10. An engine as claimed in claim 9, a filler block on the lower portion of the hanger having transverse grooves with compression springs fitting therein, said springs having projecting ends fitting in grooves through the ribs on the hanger.

11. An engine comprising in combination a cylinder having a channel at one side, a filler channel fitting therein and having securing means extending through the cylinder wall at the channel and attached outside of the cylinder, a piston having a hanger with a filler block operating in the filler channel, the hanger having enlarged lugs at the top and bottom, there being longitudinal grooves on the hanger with packing strips fitted therein, the packing strips having enlargements at the top and bottom fitting between the enlarged end portions of the hanger.

12. An engine as claimed in claim 11, the filler channel having longitudinal shoulders and the hanger having longitudinal ribs operating against the said shoulders, there being transverse grooves in the filler block with spring strips fitting in said grooves, the strips having projecting ends fitting in grooves in the said ribs.

In testimony whereof I have signed my name to this specification.

CLARENCE G. EDWARDS.